Jan. 25, 1938.　　　　C. C. LUMRY　　　2,106,487
DISPLAY CASE
Filed March 13, 1936　　　2 Sheets-Sheet 1

Inventor:
Carl C. Lumry:
By: Jones, Addington, Ames & Seibold
Attys.

Jan. 25, 1938. C. C. LUMRY 2,106,487
DISPLAY CASE
Filed March 13, 1936 2 Sheets-Sheet 2
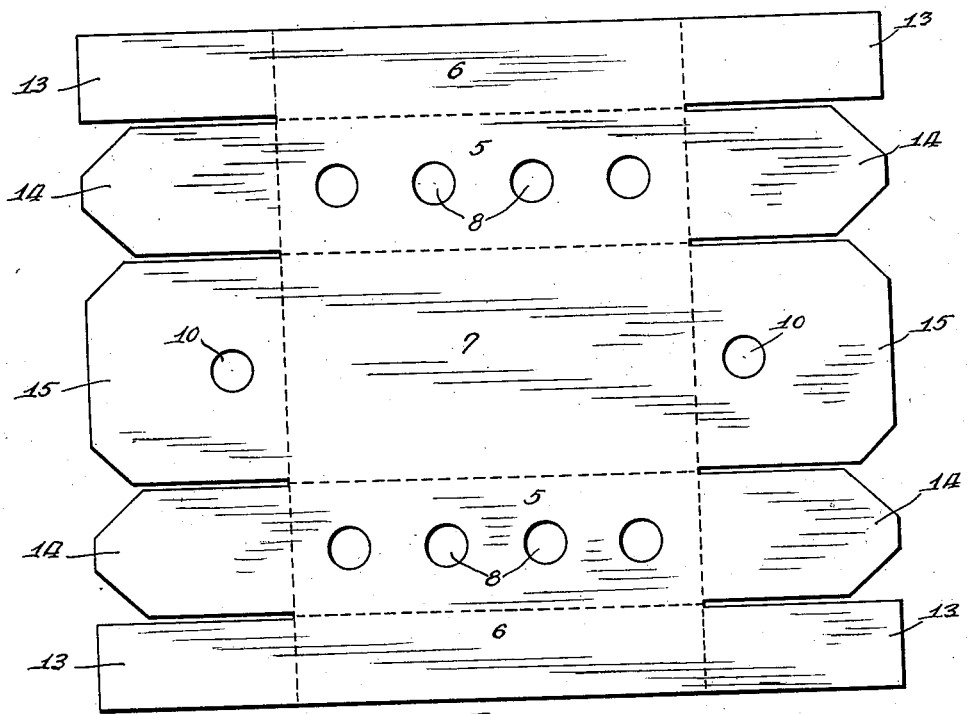
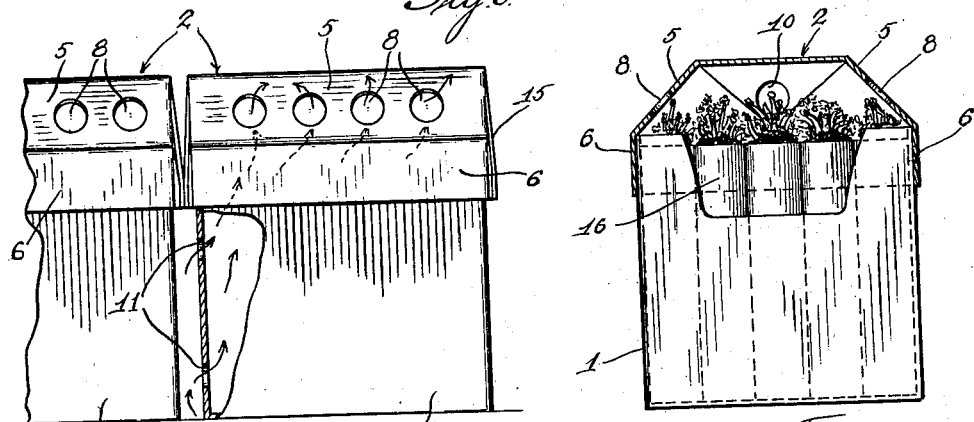
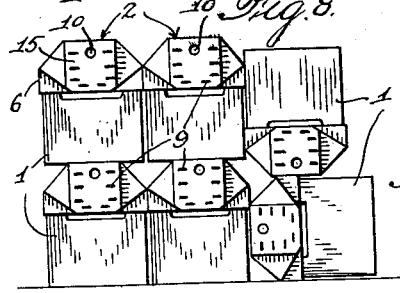
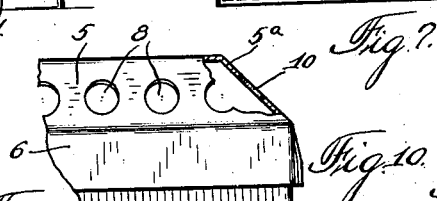
Inventor.
Carl C. Lumry.
By Jones, Addington, Ames & Seibold
Attys.

Patented Jan. 25, 1938

2,106,487

UNITED STATES PATENT OFFICE 2,106,487

DISPLAY CASE

Carl C. Lumry, Shenandoah, Iowa, assignor to Mount Arbor Nurseries, Shenandoah, Iowa, a corporation of Iowa Application March 13, 1936, Serial No. 68,599

4 Claims. (Cl. 206—44)

This invention relates to a combined container, shipping case and display case, and more particularly to a case for transporting, storing and displaying all types of plants, whether growing or dormant, in which the same container may be used for display purposes without removing the plants therefrom.

The word "plant" as used herein is intended to include small trees, evergreens, roses, shrubs, etc., as well as the above noted plants. In the nursery trade, "plant" usually includes everything except trees and evergreens and in the smaller sizes even these are often referred to as "plants".

The present invention provides a particularly suitable container for so-called dormant stock such as certain varieties of herbaceous or deciduous plants which may be dormant when packed and yet start growing when the container is exposed to light and warmth.

The present invention provides an efficient display container and is particularly adapted for use in the shipment and display of a plurality of plants packed in a single case in such a manner that all of the plants therein may be easily inspected when the container is placed on display in a retail store. These containers are arranged to contain a number of individually-wrapped plants and to present a clear top view as well as a side view of the plants and a portion of the individual wrappers. The plants for which the containers are designed are usually individually wrapped in peat, spagnum moss, shingle tow, or dirt separately or in combination. The wrappers are usually waterproof paper, cardboard tubes or the like. The container usually contains twenty-five of these individually-wrapped plants, although more or less may be packed as desired.

The containers are particularly adaptable for perennials, annuals or biennials, which are usually shipped and stored in the spring when the plants have new, soft and immature top growth and will die if crushed or damaged. The plants are highly perishable and require proper ventilation to prevent smothering, crown rot, etc.

It is therefore an object of the invention to provide a combined shipping and display container which will at all times provide the essential ventilation and will also provide sufficient space and protection for top growth.

Another object is to provide a combination shipping and display container which will provide proper ventilation in shipping and storing and at the same time have desirable sales appeal features when displayed by the retailer. Plants offered for sale should be attractively displayed in a manner to harmonize with the atmosphere of the store and attract customers. The present invention provides a combined shipping, storing and display case having all the previously mentioned plant protecting and space conserving features and in which easily visible, decorative features convey to the customer desirable information relative to the plants and the customer may also freely inspect the plants without moving the case.

A further object is to provide an inexpensive case of minimum size relative to the plants packed therein and which will be strong and rigid and so constructed that large numbers of the containers may be closely packed or piled together in any desired relationship and still provide sufficient ventilation and protection to all of the plants.

Further objects will be apparent from the specification and the appended claims.

In the drawings—

Fig. 6 is a plan view of the cover blank before being formed and stapled or otherwise secured;

Fig. 7 is a front view of the container with the front knock-out removed to display the individual wrappers and with the cover illustrated in section;

Fig. 8 illustrates two adjacent containers, a portion of the back wall of one of the containers being broken away to illustrate the method of ventilation during storing or shipping;

Fig. 9 is a diagrammatic view illustrating the storing of containers in various positions while still permitting ventilation; and Fig. 10 is a fragmentary side elevation, partially in section, of a slightly modified cover.

Figures 1, 2:
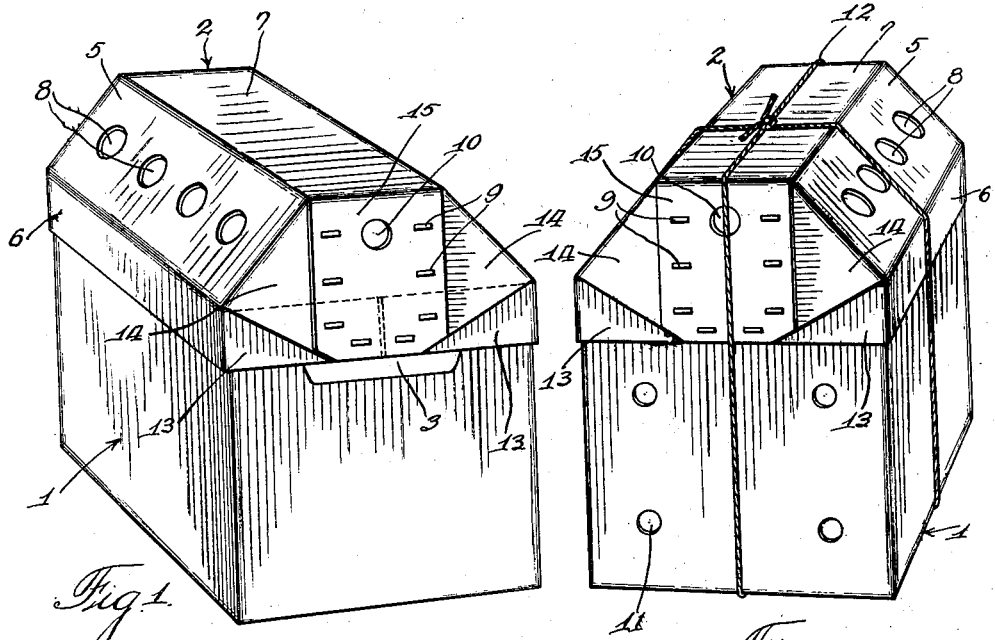
Figure 1 is a front perspective view of one embodiment of the invention and illustrates the container and cover therefor.
Fig. 2 is a back perspective view of the embodiment illustrated in Fig. 1.

Referring to the drawings in detail, the embodiment illustrated comprises a container having an open-top box portion 1 and a cover 2. The front side of the box is provided with a so-called knock-out portion 3 which is similar to that illustrated in Fig. 5. This knock-out portion may be perforated on a desired outline or may be sheared as illustrated, except at points indicated by the reference character 4, so that the knock-out is retained in position until it is desired to use the container for display purposes. The removable portion may be of any desired shape so that the individual plant wrappers may be displayed when it is removed.

The cover 2 comprises side walls having angular portions 5 and vertical portions 6, the latter being arranged to telescope over the box 1. A flat portion 7 is provided which functions to support other containers when they are stacked for storing and also provides an imperforate space for a shipping label. The angular side walls 5 are provided with comparatively large perforations 8 and the ends are preferably formed of suitable flaps which are folded and secured together by means of staples 9, as illustrated, or by any other suitable means. The end walls of the cover are also provided with perforations 10. The ends of the cover may also have perforated angular portions, if desired, as indicated at 5a in Fig. 10.

The container, including the box cover, is preferably made of corrugated paper board, fiber or other suitable comparatively rigid material and the angular construction of the cover and the method of securing the end walls provide an extremely rigid case which is not easily crushed or otherwise damaged. Perforations 11 may be provided in one or more of the walls of the box 1, preferably in the rear wall as shown, and after the boxes are filled for shipment the cover may be secured by a suitable cord 12, as shown in Fig. 2.

The blank for the cover is preferably made as illustrated in Fig. 6 and scored along the dotted lines. The flaps 13 are folded inwardly as illustrated in dotted lines in Fig. 1. The flaps 14 are then folded to overlap the flaps 13. A central flap 15 is then folded downwardly, as illustrated, and overlaps all of the other flaps and is secured thereto by means of the staples 9, thereby forming a very rigid construction. The thickness of the overlapping flaps at the vertical central plane of the cover prevents close contact of adjacent containers when they are stored and enables free ventilation therebetween and through the perforations.

Figure 4:
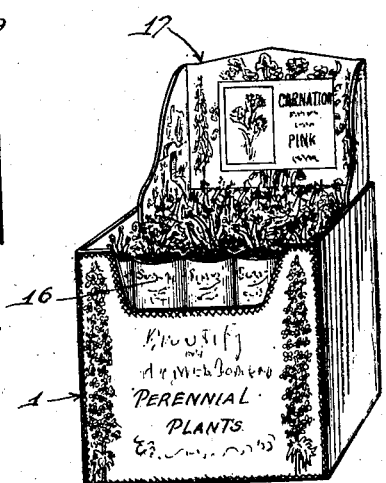
Fig. 4 is a perspective view of the container with the cover and knock-out portion removed and the back panel placed in position, and illustrates a preferred decorative ensemble.

The individual plants are usually wrapped in cylindrical form, as illustrated in Fig. 4, thereby providing vertical spaces therebetween, and the perforations in the rear wall and in the cover enable free circulation of air. When the containers are piled for storage as illustrated in Figs. 8 and 9 the angular cover portions 5 permit free and unrestricted ventilation between the containers and provide an unrestricted ventilation at all times, as illustrated by the arrows in Fig. 8.

In the embodiment illustrated in the drawings the covers are provided with 45-degree angular portions 5. However, it will be understood that any suitable angle may be used and the cover may be as high as required to provide sufficient room for plant growth above the top of the box portion. It is desirable that the side walls of the box portion 1 should not extend greatly above the wrappers of the plant packages 16 in order that they may be properly displayed after the cover is removed. It is therefore preferable that the plant space should be provided in the cover and not in the box portion. The plants are usually displayed by the dealer on stepped counters and it is desirable that a customer be able to see the plants from the front as well as from the top. The dealer therefore breaks out the perforated or sheared portion 3 and a back display panel 17 is then positioned on the back wall of the box as illustrated in Figs. 4 and 5.

Figure 3:
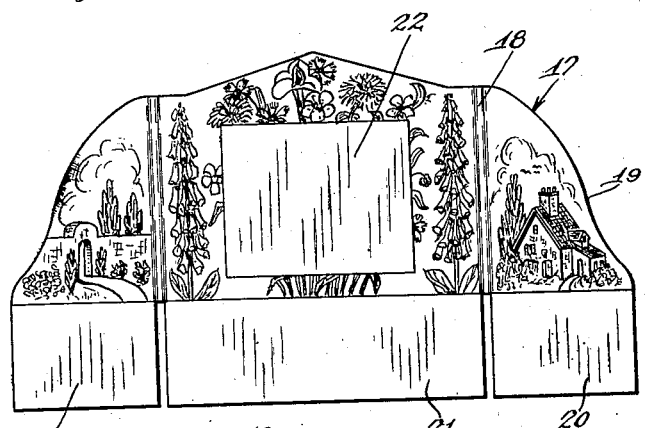
Fig. 3 is a front elevation of the decorative display panel with the wings extended.
Figure 5:
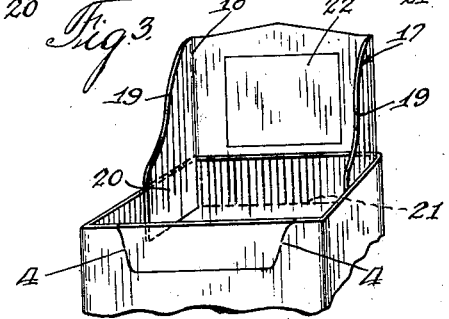
Fig. 5 is a fragmentary perspective view of a container and illustrates the method of applying the back panel thereto.

The decorative back panel 17 is scored for folding along the dotted lines 18 (Fig. 3) so that the side panels 19 may be bent forwardly and the lower ends 20 inserted inside the box as shown in Fig. 5. The middle flap portion 21 is placed outside the box as shown and the display panel is therefore rigidly supported. The cut-out portion 3 may of course be as large as desired. However, in ordinary practice it is preferable that this should not extend greatly below the cover, and therefore if more ventilation is desired this knock-out portion may be removed before the containers are stored.

The back panel 17 is preferably provided with a blank space on which a decorative sticker may be placed, illustrating in colors the blossoms which may be expected from the plants in the case and also having thereon full information relative to the plants. The knock-out portion or panel 3 is preferably retained in place until the cover is removed to display the plants. This panel is comparatively rigid and prevents the angular sides of the cover from crushing the end wall when weight is applied by stacking the cases.

It will be apparent that various changes may be made in detail without departing from the spirit of the invention. It is, therefore, desired that the invention be limited only by the prior art and the scope of the appended claims.

Having thus described the invention, what is claimed and desired to be secured by Letters Patent is:

1. A combined shipping and display container comprising a perforated open-top box arranged to receive wrapped plants with the wrappers not substantially above the side walls, a normally attached knock-out panel in the front wall and removable to enable inspection of the plant wrappers, a perforated removable cover on said box and constructed and arranged to enable ventilation between adjacent stacked containers and through said perforations, said cover extending above said box to provide plant growth space therein, and a display panel adapted to be mounted on the rear wall of said box and extending above said plants with its lower central portion outside said box and inturned side flanges extending downwardly into said box adjacent the side walls.

2. A combined shipping and display case comprising a substantially rectangular box for vertically positioned wrapped plants, a display opening in the front wall of said box whereby the plant wrappers are visible, a removable decorative back panel mounted on and forming a vertical extension of the rear wall, forwardly extending side flanges on said panel and susbtantially in alignment with the side walls, said rear wall being perforated below said back panel, a cover adapted to telescope over said box when said panel is removed and having space therein above said box for plant growth, said display opening forming a material portion of the top margin of the front wall of said box and extending below said telescoping cover to provide ventilation, and means within the included angle of the cover top and the side walls to enable free circulation of air between adjacent cases when they are stacked and through said cover.

3. A combined shipping and display container for growing plants comprising an open-top box of substantially the same height as the wrappers of plants to be packed therein, said plants having their foliage portion above said wrappers, an upper marginal knock-out portion arranged to display a substantial portion of said wrappers when removed; a telescoping cover for said box and having angular sides arranged to support said cover to provide a plant growth space therein above said box and ventilating openings in the angular portion of said cover.

4. A plant container comprising a substantially rectangular box, a cover telescopically mounted on said box and extending above the walls thereof to provide plant growth space, a marginal knock-out panel forming the top edge of the front wall of said box and extending below the telescoping part of said cover and enabling display of the contents of said box when removed, said cover above said box having a substantially flat imperforate top portion and perforated sloping sides.

CARL C. LUMRY.